Feb. 9, 1932.    R. L. DEZENDORF    1,844,843
METER TESTING APPARATUS
Filed Dec. 24, 1928
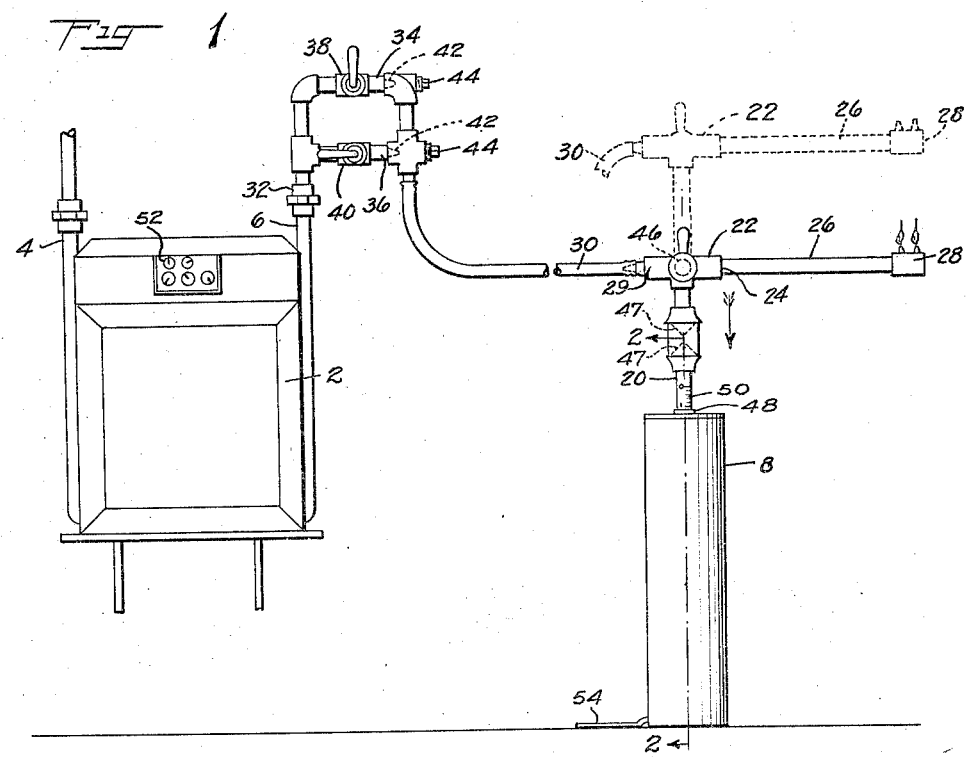
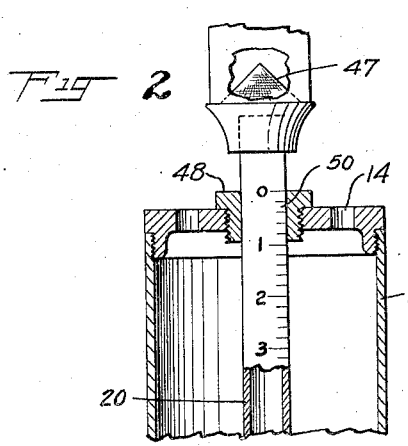
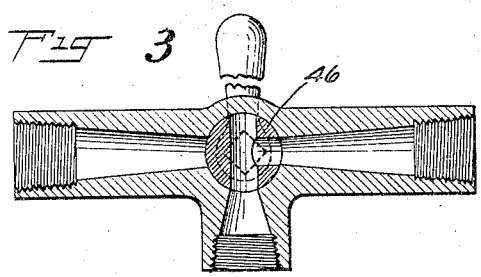
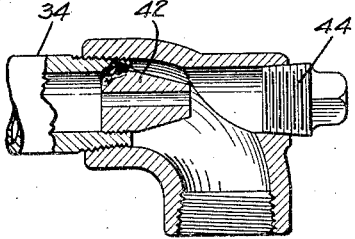
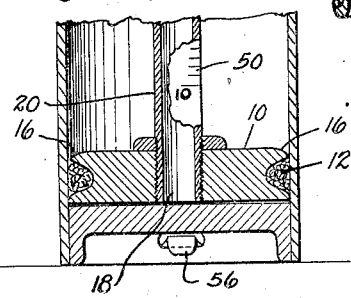
INVENTOR.
R. L. Dezendorf.
BY Bartlett Bonnes
ATTORNEYS.

Patented Feb. 9, 1932

1,844,843

UNITED STATES PATENT OFFICE

RICHARD L. DEZENDORF, OF HOLLIS, NEW YORK

METER TESTING APPARATUS

Application filed December 24, 1928. Serial No. 328,260.

My invention relates to apparatus for testing meters and is particularly useful in testing meters by an apparatus connected to the outlet of the meter. The object of my invention is to provide a dry testing apparatus which is small and compact. It further has for its object to provide testing apparatus of simple construction with a minimum of parts. It further has for its object to provide a meter testing device in which the parts to be manually operated are easily accessible.

The following is a description of an embodiment of my invention reference being had to the accompanying drawings, in which:

Figure 1 shows a side elevation of an apparatus comprising my invention connected to the outlet of a meter;

Fig. 2 is a sectional view of the cylinder and piston on the line 2—2, Fig. 1;

Fig. 3 is a sectional view of my preferred form of means for controlling passages connected to the variable chamber of the device;

Fig. 4 is a sectional view showing one of the calibrating devices in the meter connection construction.

Referring more particularly to the drawings, 2 is a gas meter having its inlet port 4 connected to a source of air or gas supply and its outlet port 6 connected to the meter testing apparatus.

The meter testing apparatus comprises a variable chamber composed of a vertical cylinder 8 having within it a tight fitting sliding piston 10 provided with suitable packing 12 which may be kept moistened by suitable oil or lubricant supplied through the openings 14 and guided to the packing by the beveled edge 16 of the body of the piston. The variable chamber formed by the piston and cylinder has a port 18 from which leads a pipe or conduit 20 forming a rod for the piston, which conduit terminates in a T-shaped head 22 which serves as a lifting handle for the piston and to one end of which is removably connected at 24 a pipe 26 carrying a burner head or other discharge member 28. To the other end 29 of the T-head 22 is attached a meter connection 30 in the form of a flexible hose which in turn is connected to a coupling member 32 through parallel branches 34 and 36 closed, respectively, by cocks 38 and 40. These branches are differently calibrated—one having a fairly large capacity, while the other has a small capacity, these calibrations being obtained by plugs 42 accessible through the closing plugs 44 in line therewith. The meter and burner are alternately connected to the variable chamber by a three-way cock 46 in the T-head 22 which can also be positioned to connect the burner directly with the meter. In the conduit 20 between the burner 28 and the variable cylinder are inverted gauze shields 47 which prevent the flame from the burner flashing back into the variable chamber when gas is used for testing.

The upper end of the piston rod is guided by the bushing 48 and the body of the rod is provided with calibration marks 50 for indicating the partial strokes of the piston.

Assuming that the meter dial has a one-half foot indicator 52 I make the variable chamber such that a full movement of the piston from the bottom-most position to the uppermost position will cause the capacity of the chamber to vary by one-sixth of a cubic foot, with the result that three upward strokes of the piston 10 will draw in from the meter one-half foot of air or gas, the three-way cock during the upstroke of the piston being turned 180° from the position shown in Fig. 3 and during the down stroke of the piston being as shown in Fig. 3. With such an arrangement and with three complete strokes of the piston one-half of a cubic foot of air or gas will be received from the meter and discharged at the burner or discharge orifice. After three such strokes if the one-half foot indicator 52 fails to register one-half foot it will be apparent that the meter is defective. If it registers less than one-half foot the meter is slow and if it registers more than one-half foot the meter is fast and registers more than the amount of gas actually consumed. Two tests should be made. One with the passage 34 opened and the passage 36 closed, and the other with the passage 36 open and the passage 34 closed, in order to get the readings on the meter with both a rapid and slow flow of gas. The flexible hose 30 permits the operation of the piston to which it is connected.

Before starting a test of a meter I connect the discharge orifice 26 directly to the meter and permit air or gas to flow until the index of the one-half foot dial 52 reaches a proper starting point.

In order to hold the cylinder in position during operation I provide a piece 54 having a hooked end 56 passing through a hole adjacent to the bottom of the cylinder and below the variable chamber so that it may be secured to a floor or platform to hold the cylinder down during operation.

As will be evident to those skilled in the art, my invention permits various modifications without departing from the spirit thereof or the scope of the appended claims.

What I claim is:

1. A meter testing apparatus comprising a variable chamber formed by a cylinder and a piston slidable therein, said chamber having a port acting as both an outlet and inlet therefor, a conduit leading from said port to the upper end of said cylinder, a discharge member adapted to be supplied through said conduit, a meter connection leading to said conduit and manually operable means for connecting said discharge member and meter connection one at a time to said port through said conduit and for connecting said meter connection directly to said discharge member.

2. A meter testing apparatus comprising a variable chamber formed by a cylinder and a piston slidable therein, said chamber having a port acting as both an outlet and inlet therefor, a conduit having a T-shaped head leading from said port to the upper end of said cylinder and constituting the rod and operating handle of said piston, a discharge member adapted to be supplied through said conduit, a meter connection leading to said conduit and manually operable means in said T-shaped head for connecting said discharge member and meter connection one at a time to said port through said conduit and for connecting said meter connection directly to said discharge member.

3. A meter testing apparatus comprising a variable chamber formed by a cylinder and a piston slidable therein, said chamber having a port acting as both an outlet and inlet therefor, a conduit having a T-shaped head leading from said port to the upper end of said cylinder and constituting the rod and operating handle of said piston, a discharge member adapted to be supplied through said conduit, a meter connection leading to said conduit and a manually operable three-way cock mounted in said T-shaped head for connecting said discharge member and meter connection one at a time to said port through said conduit and for connecting said meter connection directly to said discharge member.

4. A meter testing apparatus comprising a variable chamber formed by a cylinder and a piston slidable therein, said chamber having a port acting as both an outlet and inlet therefor, a conduit having a T-shaped head leading from said port to the upper end of said cylinder and constituting the rod and operating handle of said piston, a discharge member adapted to be supplied through said conduit, a meter connection leading to said conduit and manually operable means in said T-shaped head for connecting said discharge member and meter connection one at a time to said port through said conduit and for connecting said meter connection directly to said discharge member, and a gauze shield in said piston rod conduit.

5. A meter testing apparatus comprising a variable chamber formed by a cylinder and a piston slidable therein, said chamber having a port acting as both an outlet and inlet therefor, a conduit leading from said port to the upper end of said cylinder, a discharge member adapted to be supplied through said conduit, a meter connection leading to said conduit and manually operable means for connecting said discharge member and meter connection one at a time to said port through said conduit and for connecting said meter connection directly to said discharge member, said meter connection having two branches in parallel and having differently calibrated passages, and means for closing said passages one at a time.

In testimony whereof, I have signed my name to this specification this 19th day of December, 1928.

RICHARD L. DEZENDORF.